(12) United States Patent
Tao (10) Patent No.: US 7,959,100 B2
(45) Date of Patent: Jun. 14, 2011

(54) DOUBLE-GEAR DRIVING MECHANISM FOR A REEL UNIT

(76) Inventor: Ning Tao, Shangai (CN)

( * ) Notice: Subject to any disclaimer, the term of this patent is extended or adjusted under 35 U.S.C. 154(b) by 0 days.

(21) Appl. No.: 12/226,370

(22) PCT Filed: Apr. 19, 2006

(86) PCT No.: PCT/CN2006/000731
§ 371 (c)(1),
(2), (4) Date: Nov. 9, 2009

(87) PCT Pub. No.: WO2007/118366
PCT Pub. Date: Oct. 25, 2007

(65) Prior Publication Data
US 2010/0044488 A1   Feb. 25, 2010

(51) Int. Cl.
*A01K 89/01* (2006.01)
(52) U.S. Cl. ......... 242/263; 242/249; 242/257; 242/279
(58) Field of Classification Search .................. 242/249, 242/257, 263, 278, 279
See application file for complete search history.

(56) References Cited

U.S. PATENT DOCUMENTS

| 4,416,428 | A | * | 11/1983 | Noda | 242/241 |
| 4,524,923 | A |  | 6/1985 | Tunoda et al. | 89/1 |
| 5,232,181 | A | * | 8/1993 | Fujine | 242/241 |
| 6,394,380 | B2 | * | 5/2002 | Takikura | 242/279 |
| 6,634,587 | B2 |  | 10/2003 | Fleming | 89/15 |
| 2002/0003182 | A1 | * | 1/2002 | Takikura | 242/279 |
| 2004/0227028 | A1 | * | 11/2004 | Nishikawa et al. | 242/249 |

FOREIGN PATENT DOCUMENTS

| CN | 2350976 Y | 12/1999 |
| CN | 2003-189766 | 7/2003 |
| CN | 2696773 Y | 5/2005 |
| WO | WO 00/38511 | 7/2000 |

* cited by examiner

*Primary Examiner* — Emmanuel M Marcelo
(74) *Attorney, Agent, or Firm* — Head, Johnson & Kachigian, P.C.

(57) ABSTRACT

A double-gear driving mechanism for a reel unit comprises a reel chamber in which a rotor drive shaft is disposed longitudinally and a master gear shaft is disposed laterally. A main gear is formed around a periphery of the drive shaft, and a first master gear is fixed on one end of the master gear shaft. A crank handle is connected to a male thread portion of the master gear shaft. The inner teeth around a periphery of the first master gear engage the teeth of the main gear. An idle pinion provided on the other side of the drive shaft in parallel and it engages the main gear. On the other end of the master gear shaft is fixed a second master gear, inner teeth of which engage the teeth of the idle pinion. The present invention provides a double-gear drive mode of the rotor drive shaft by using the idle pinion. This increases the lifting capability of the rotor drive shaft while the original strength of the pinion teeth still remaining unchanged. Meanwhile, the double-gear driving mechanism of the present invention features a high specific speed, at the same time it is easy to manufacture and exhibits good mating conditions.

6 Claims, 7 Drawing Sheets

DOUBLE-GEAR DRIVING MECHANISM FOR A REEL UNIT

CROSS-REFERENCE TO RELATED APPLICATION

This application is the U.S. National Phase of PCT Application No. CN2006/000731 filed 19 Apr. 2006 which is incorporated herein by reference.

TECHNICAL FIELD

The present invention relates to a fishing tackle, and more particularly, to a double-gear driving mechanism for a reel unit.

BACKGROUND ART

In order to reduce volume and to unwind or rewind the fishing line as quickly as possible, fishing reels currently available are all designed to unwind or rewind the fishing line by manually operating a crank handle to drive a small-module single-gear driving mechanism which in turn drives a rotor to rotate. Meanwhile, for the purpose to reduce the weight, the gear is made to have a limited strength. This kind of structure works well for fishing of small size fish. However, when fishing a fish of larger size, the user tends to subconsciously apply more force to the crank handle. In this case, top portions of the pinion teeth are subjected to a substantial force that may possibly cause significant wear or even fracture of the top portions, which is undesirable for the user.

BRIEF SUMMARY OF THE INVENTION

The present invention aims to overcome the aforesaid shortcomings of the prior art. To this end, the present invention provides a double-gear driving mechanism for a reel unit, which can enhance the overall bearing capacity to the rotor drive shaft of the reel unit on the premise that without increasing the volume of the reel unit as well as keeping the velocity of unwinding and rewinding.

A technical solution of the present invention is as follows:

A double-gear driving mechanism for a reel unit comprises a reel chamber in which a rotor drive shaft is disposed longitudinally and a master gear shaft is disposed laterally. A main gear is formed around a periphery of the drive shaft, a master gear shaft is disposed laterally in the reel chamber and a first master gear is fixed on one end of the master gear shaft. A crank handle is connected to a male thread portion of the master gear shaft. Inner teeth around a periphery of the first master gear engage teeth of the main gear. An idle pinion provided on the other side of the drive shaft in parallel engages the main gear. On the other end of the master gear shaft is fixed a second master gear, inner teeth of which engage teeth of the idle pinion.

The reel chamber is formed with a through-hole and a first hole in a front wall thereof, and is formed with a second hole corresponding to the first hole in a rear wall thereof. The drive shaft is formed with an axial through-hole for a reciprocating shaft to be inserted therethrough. The reciprocating shaft is capable of reciprocating through the axial through-hole. The front protrusion of the cam shaft having bidirectional spiral grooves insert therethrough the axial through-hole of the idle pinion, and they fix together. Additionally, a slide block having a first and a second through-hole slide over the cam shaft by means of the first through-hole. The second through-hole is adapted to fix a rear protrusion of the reciprocating shaft.

The first and the second holes are provided to mount the cam shaft, while the through-hole is provided to mount the drive shaft.

At least one of the master gears is fixed to the master gear shaft by means of a detachable fixing mechanism.

The detachable fixing mechanism of the master gear and the master gear shaft comprises a pin hole formed in the master gear shaft as well as a pin, a butterfly retaining block, an elastic ring and a protrusion formed with a butterfly-shaped cavity inside the gear that are sequentially nested together.

The master gear is connected to the master gear shaft by means of a spline.

The through-hole, the first hole and the second hole are provided with a bearing respectively.

Advantageous effect of this invention is as follows:

1. By use of an idle pinion, the present invention provides a double-gear drive mode of the rotor drive shaft. This increases the lifting capability of the rotor drive shaft while the original strength of the pinion teeth still remaining unchanged;
2. The present invention employs a small-module gear system, so a reel unit featuring a high specific speed can obtain without increasing the volume of the reel unit;
3. The idle pinion of the present invention can drive the cam shaft to move the reciprocating shaft and consequently the line enclosure to move reciprocally;
4. As the master gear shaft and the master gears of the present invention are connected by use of a snap ring and an elastic ring, high precision requirements on individual components are eliminated, which is favorable for mating between the individual components.

Wherein:
1—Casing; 1a—Through-hole; 1b—The first hole;
1c—The second hole; 2—Casing cover;
3—Drive shaft; 3a—Main gear; 3b—Turning direction;
4—Idle pinion; 4a—Pinion tooth; 4b—Turning direction; 4c—Notch
5—Master gear shaft; 5a—Right pin hole; 5b—Left pin hole;
5c—Male thread portion; 6—Pin; 7—Butterfly retaining block;
7a—Pin slot; 7b—Outer profile;
8—Elastic ring; 8a—Butterfly-shaped cavity; 8b—Outer profile;
9—The first master gear; 9a—Left inner tooth; 9b—Protrusion;
9c—Butterfly-shaped cavity; 10—The second master gear;

10a—Right inner teeth; 11—Handle; 11a—Turning direction;
12—Cam shaft; 12a—Rear protrusion; 12b—Front protrusion; 12c—Notch;
12d—Bidirectional spiral grooves; 13—Slide block;
13a—The first through-hole; 13b—The second through-hole;
13c—Threaded hole; 13d—Pin hole;
14—Slide block pin; 14a—Pawl;
15—Cover;
16—Screw;
17—Reciprocating shaft; 17a—Notch.

DETAILED DESCRIPTION OF THE INVENTION

Hereinafter, the present invention will be further described with reference to embodiments thereof and the attached drawings, although this is not intended to limit scope of the present invention.

Referring to FIGS. 1, 2, 3, 4, 5 and 6 at first, a double-gear driving mechanism for a reel unit according to Embodiment 1 of the present invention comprises a reel chamber, which is comprised of a casing 1 and a casing cover 2, within the reel chamber, a rotor drive shaft 3 is disposed longitudinally and a master gear shaft 5 is disposed laterally. A main gear 3a is formed around a periphery on a rear protrusion of the drive shaft 3, and a first master gear 9 is fixed on the right end of the master gear shaft 5. A crank handle 11 is connected to the master gear shaft 5 at a male thread portion 5c outside the first master gear 9 and the chamber. Left inner teeth 9a around a periphery of the first master gear 9 engage teeth of the main gear 3a. An idle pinion 4 provided on the other side of the drive shaft 3 in parallel engages the main gear 3a. On the left end of the master gear shaft 5 is fixed a second master gear 10, the right inner teeth 10a around a periphery of the second master gear 10 engage the teeth of the idle pinion 4. The front wall of the casing 1 is formed with a through-hole 1a and a first hole 1b, and the rear wall of the casing 1 is formed with a second hole 1c corresponding to the first hole 1b. The reciprocating shaft 17 inserts therethrough the axial through-hole of the drive shaft 3. The reciprocating shaft 17 is capable of reciprocating through the axial through-hole. The front protrusion of the cam shaft 12 having bidirectional spiral grooves 12d insert therethrough the axial through-hole of the idle pinion 4, and they fix together. Additionally, a slide block 13 having a first through-hole 13a and a second through-hole 13b slides over the cam shaft 12 by means of the first through-hole 13a. The second through-hole 13b is adapted to fix the rear protrusion of the reciprocating shaft 17. The first hole 1b and the second hole 1c are provided to mount the cam shaft 12, while the through-hole 1a is provided to mount the drive shaft 3. In this embodiment, both master gears (9 10) are fixed to the master gear shaft (5) by means of a detachable fixing mechanism respectively.

Figure 1:
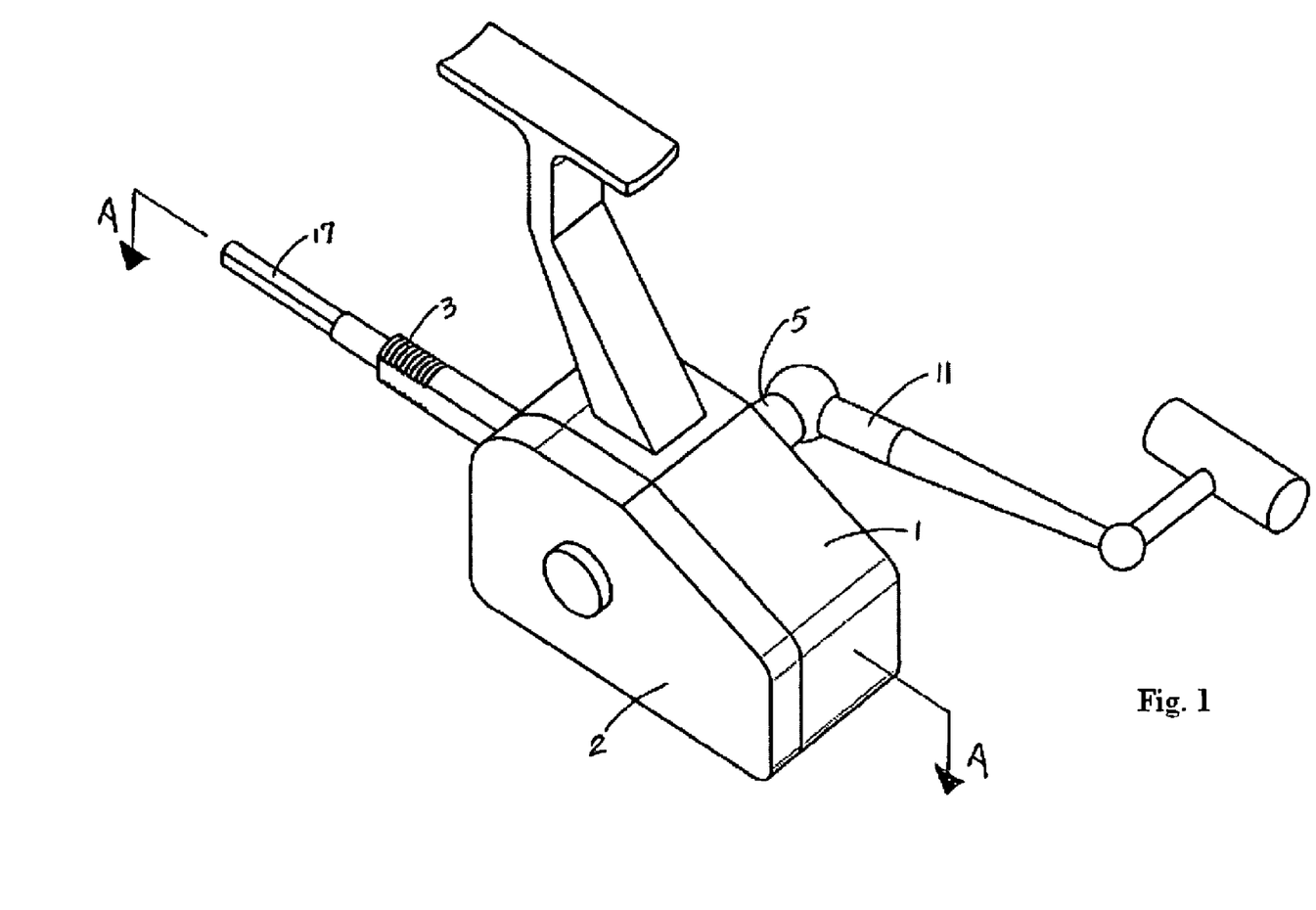
FIG. 1 is a general view of a double-gear driving mechanism for a reel unit according to the present invention.
Figure 2:
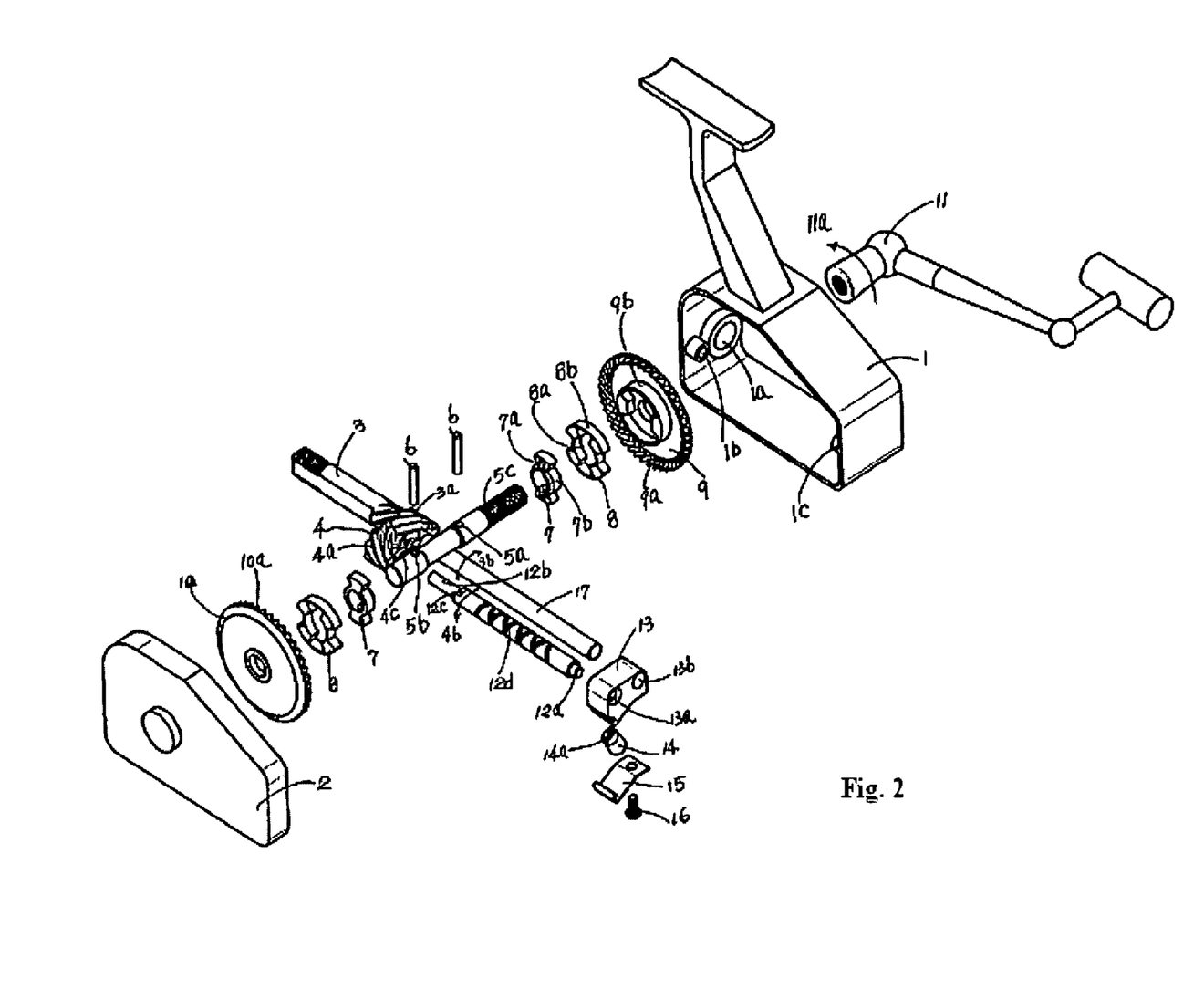
FIG. 2 is an exploded view illustrating a structure of Embodiment 1 of the double-gear driving mechanism for a reel unit according to the present invention.
Figure 3:
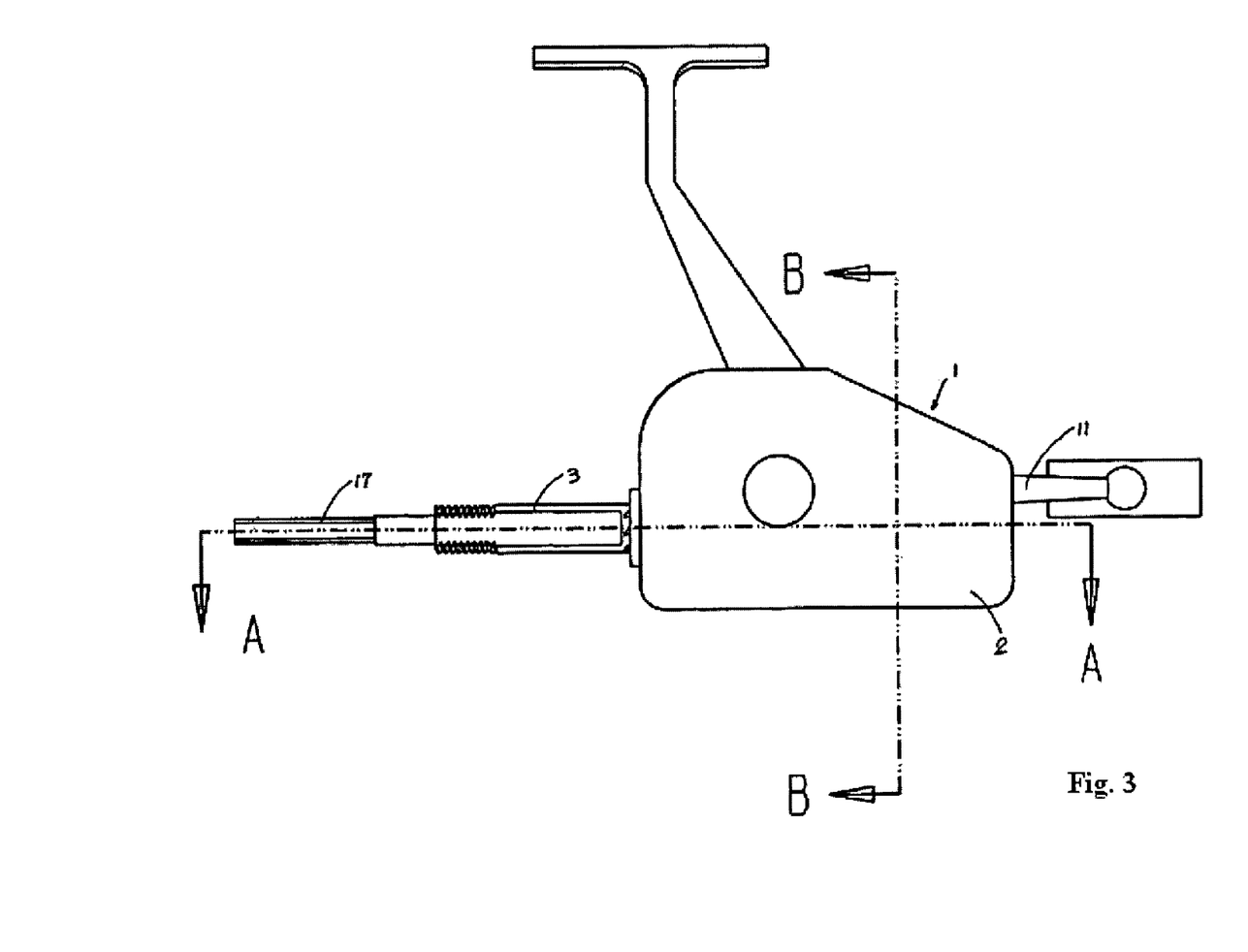
FIG. 3 is a left-side and cross-sectional view of Embodiment 1 of the present invention.
Figure 4:
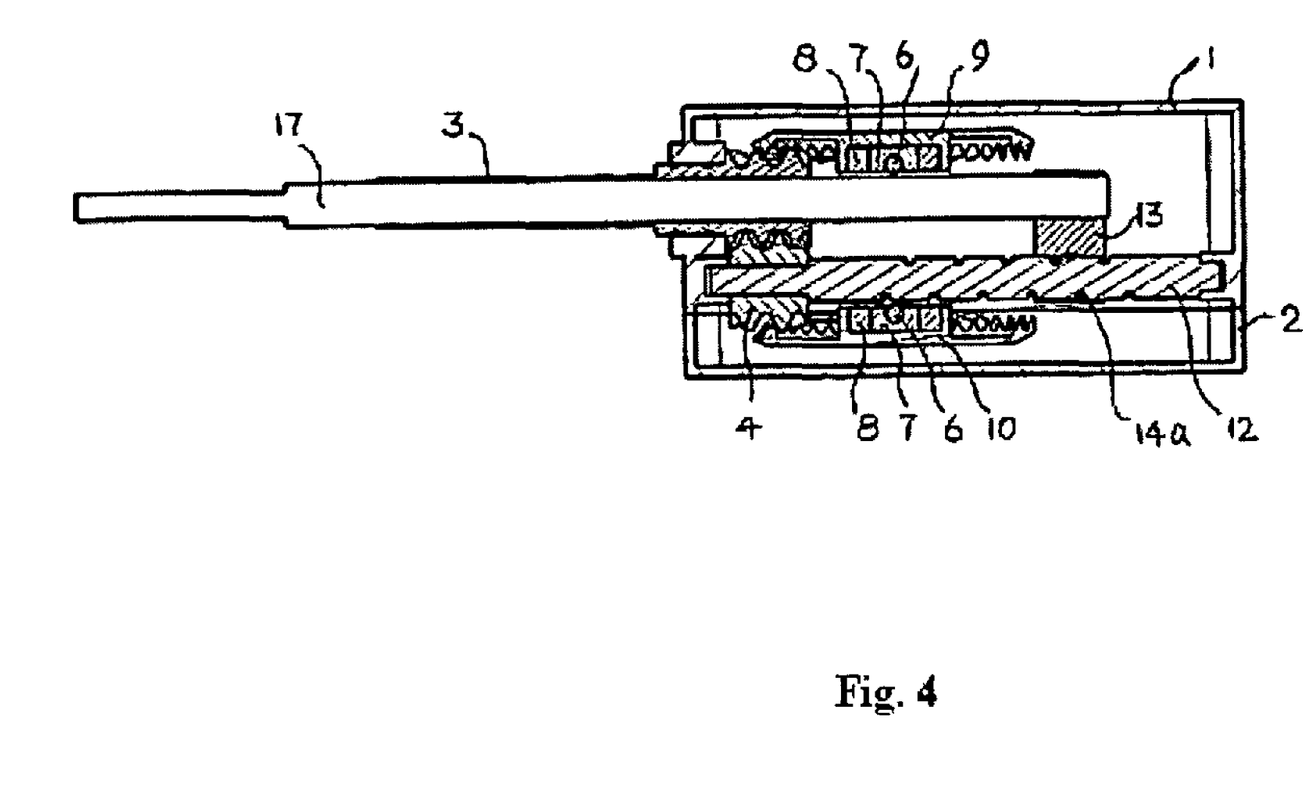
FIG. 4 is a cross-sectional view taken along a line A-A in FIG. 3.
Figure 6:
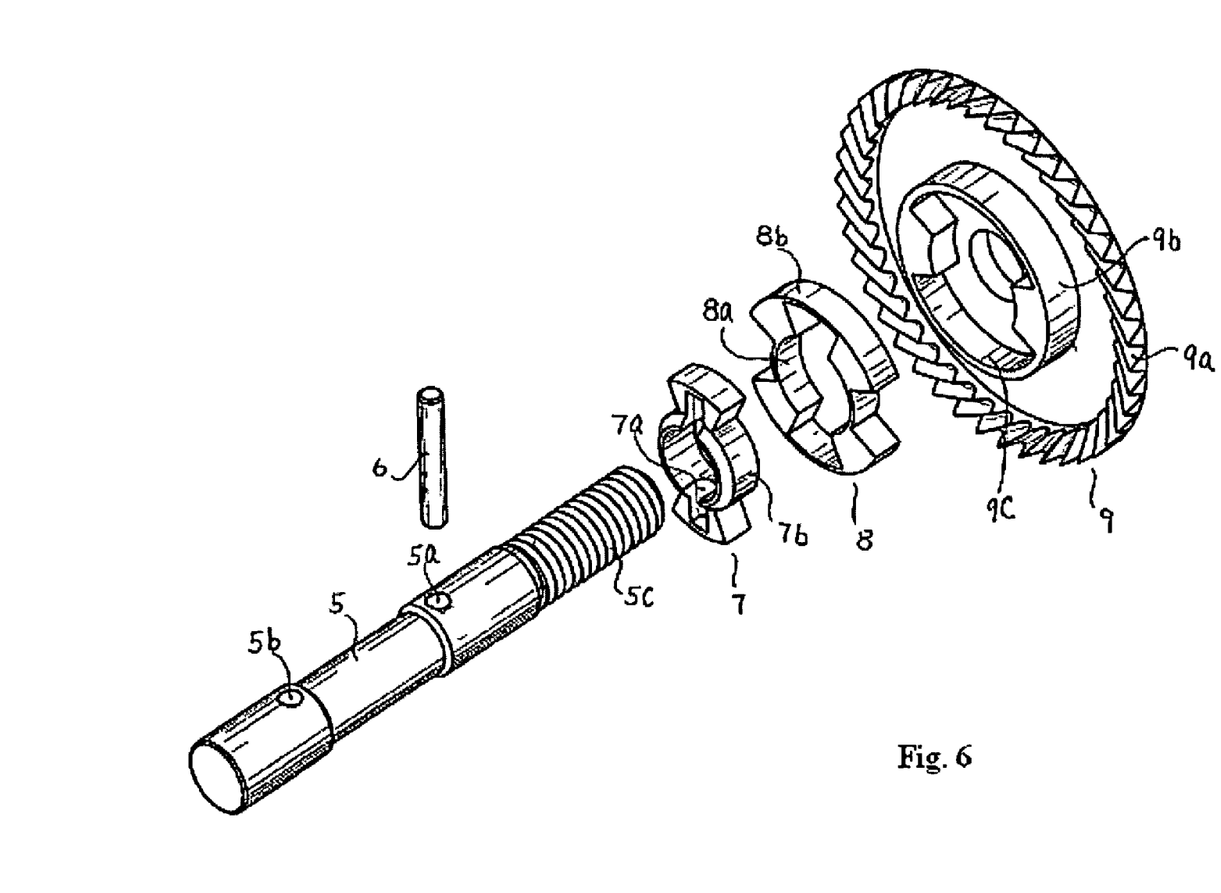
FIG. 6 is an enlarged partial view of FIG. 2.

The detachable fixing mechanism of the master gear 9 and the master gear shaft 5 comprises a pin hole 5a formed in the master gear shaft 5 as well as a pin 6, a butterfly retaining block 7, an elastic ring 8 and a protrusion 9b formed with a butterfly-shaped cavity inside the gear 9 that are sequentially nested together.

The main gear 3a formed on the drive shaft 3 engages the idle pinion 4.

Now, the assembly structure of Embodiment 1 of the present invention will be detailed as follows:

The main gear 3a of the drive shaft 3 engages the idle pinion 4. The first master gear 9 is inserted over the master gear shaft 5 by means of the elastic spring 8 and the butterfly retaining block 7. The pin 6 is inserted into the right pin hole 5a of the master gear shaft 5, and also mates with a pin slot 7a of the butterfly retaining block 7. An outer profile 7b of the butterfly retaining block 7 matches with the butterfly-shaped cavity 8a of the elastic ring 8, while an outer profile 8b of the elastic ring 8 matches with an inner surface of the butterfly-shaped cavity 9c of the internal protrusion 9b in the first master gear 9. In this way, when a user rotates the master gear shaft 5 with the crank handle 11, the pin 6 will drive the butterfly retaining block 7 to rotate synchronously with the master gear shaft 5. Via the elastic ring 8, the butterfly retaining block 7 in turn drives the first master gear 9 to rotate therewith. As the first master gear 9 engages the main gear 3a of the drive shaft 3, the main gear 3a is driven to rotate with the first master gear 9.

Similarly, the second master gear 10 is also driven to rotate by the master gear shaft 5 through the left pin hole 5b, the pin 6, the butterfly retaining block 7 and the elastic ring 8. As the second master gear 10 engages the idle pinion 4, the idle pinion 4 is driven to rotate with the second master gear 10 and the idle pinion 4 applies a force on the main gear 3a to drive the drive shaft 3 to rotate. Obviously, when the crank handle 11 rotates in a direction 11a, the first master gear 9 and the second master gear 10 also rotate in the direction 11a. It can be seen from the engagement relationships that, the main gear 3a will rotate in a direction 3b and the idle pinion 4 will rotate in a direction 4b.

It can be seen by examining the main gear 3a that, it is not only driven directly by the first master gear 9, but also be driven indirectly by the second master gear 10 via the idle pinion 4. Thus, the drive shaft 3 is provided with an additional driving force source, and they act on two different teeth of the main gear 3a of the drive shaft 3 respectively. This results in an increased driving force on the main gear 3a while the force acting on individual teeth of the main gear 3a still remains unincreased. The drive shaft 3 is mounted on the casing 1 through the through-hole 1a. The main gear 3a only rotates along its own axis with respect to the casing 1, but it can not move linearly along the axis with respect to the casing 1.

The reciprocating shaft 17 mates with a central axle hole formed in the main gear 3a, the reciprocating shaft 17 moves axially with respect to the drive shaft 3 in the central axle hole.

The cam shaft 12 has a rear protrusion 12a thereof mate with the second hole 1c of the casing 1 and a front protrusion 12b thereof mate with the first hole 1b. The cam shaft 12 within the casing 1 is only allowed to rotate along its own axis, but is not allowed to move linearly.

The idle pinion 4 is inserted over a front protrusion 12b of the cam shaft 12. As a notch 4c of the idle pinion 4 and a notch 12c of the cam shaft 12 are nested into each other, the cam shaft 12 must rotate synchronously with the idle pinion 4. Hence, the cam shaft 12 will also rotate when the second master gear 10 drives the idle pinion 4 to rotate.

Figure 5:
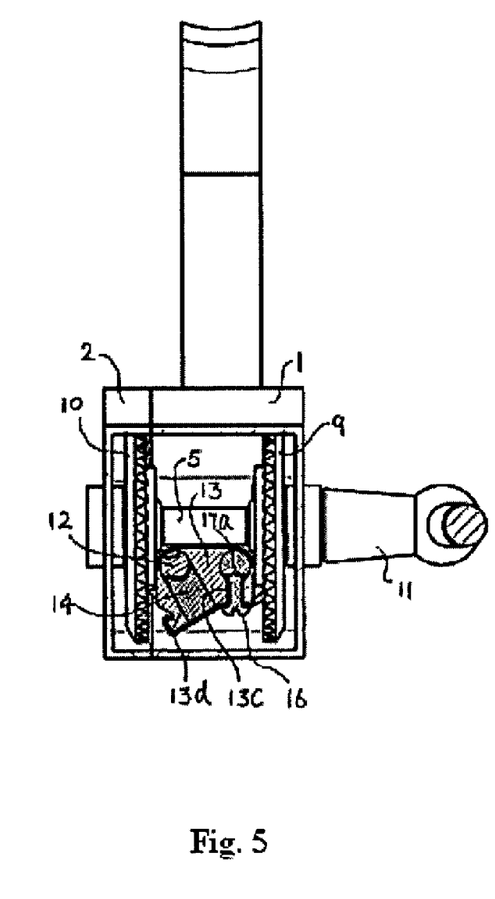
FIG. 5 is a cross-sectional view taken along a line B-B in FIG. 3.

The slide block 13 is formed with a first through-hole 13a and a second through-hole 13b parallel to each other. The first through-hole 13a allows the cam shaft 12 to rotate therein, and also allows the slide block 13 to slide axially along the cam shaft 12. The second through-hole 13b is mated with a rear protrusion of the reciprocating shaft 17 to fix the reciprocating shaft 17 and the slide block 13 together: More specifically, the slide block 13 is formed with a threaded hole 13c, and a screw 16 is threaded into the threaded hole 13c through the cover 15 until it reaches the notch 17a formed at a lower portion of the reciprocating shaft 17. As a result, the reciprocating shaft 17 and the slide block 13 are joined by the screw 16 to form an integral part, as shown in FIG. 5.

There is a pin hole 13d in the slide block 13, the slide block pin 14 is disposed in the pin hole 13d. A pawl 14a of the slide block pin 14 extends into bidirectional spiral grooves 12d of the cam shaft 12 so that when the cam shaft 12 rotates, the bidirectional spiral grooves 12d push the pawl 14a to reciprocate axially along the cam shaft 12. Accordingly, the slide block 13 fixedly connected with the pawl 14a follows and drives the reciprocating shaft 17 to reciprocate axially along the cam shaft 12.

The elastic ring 8 is provided to compensate for asynchronism among engagement of different pairs of gears arising from geometrical dimensional tolerances when manufacturing the parts. Of course, if the associated parts are manufactured with adequate dimensional precision, the master gear shaft 5 and the first master gear may also be connected directly in a rigid way without use of the elastic ring 8. For example, as shown in FIG. 7, the master gear shaft 5 is connected with the first master gear through a spline or directly mates with the chamber in the master gear by use of the pin 6.

EMBODIMENT 2

Figure 7:
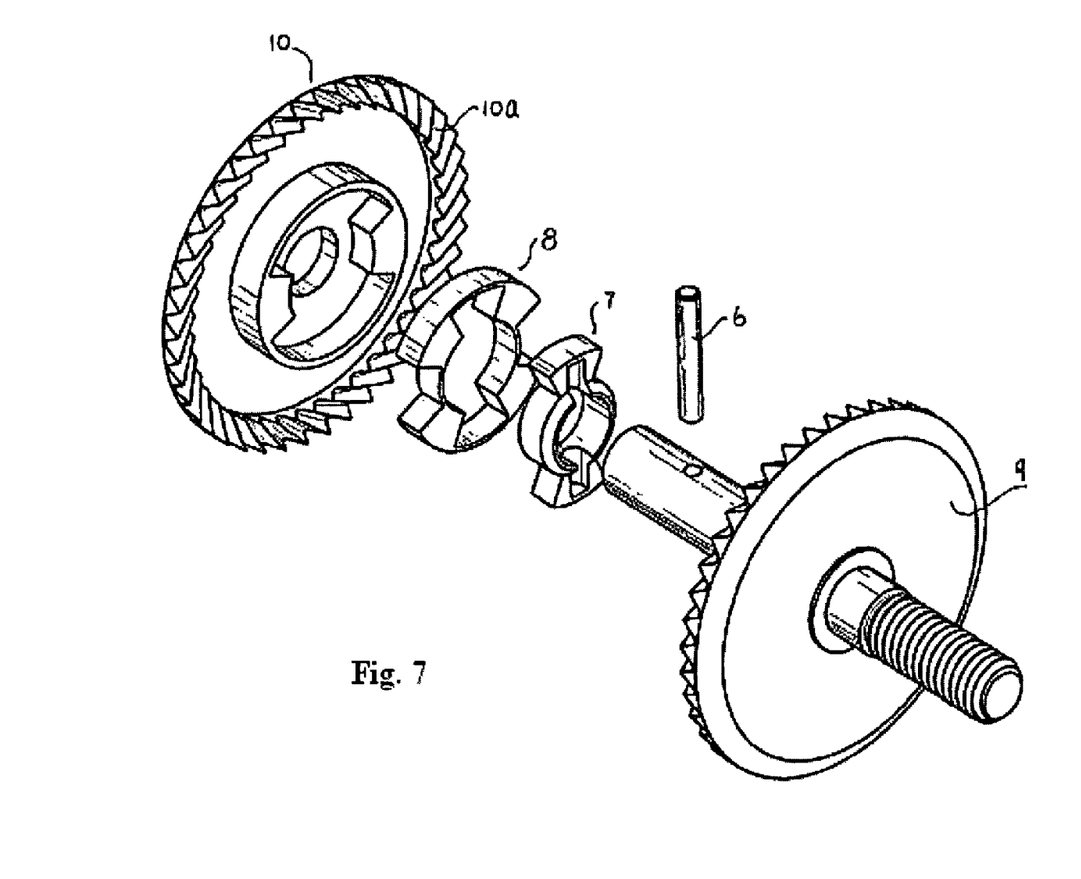
FIG. 7 is an enlarged partial view of Embodiment 2 of the present invention.

Embodiment 2 differs from Embodiment 1 only in that, it is another technical project, its aim is to simplify the structure of the assembly comprised of the second master gear and the first master gear, only one of the master gears (e.g., the second master gear 10) is connected with the master gear shaft 5 by use of an additional elastic ring 8, while the first master gear is connected with the mast gear shaft 5 directly in a rigid way (e.g., using a common spline), or the master gear shaft 5 and the first master gear 9 may be formed integrally as a unitary piece, as shown in FIG. 7. Alternatively, the second master gear 10 may be formed integrally with the master gear shaft 5 while the first master gear is connected with the master gear shaft 5 via the elastic ring 8.

The invention claimed is:

1. A double-gear driving mechanism for a reel unit, comprising as reel chamber in which a rotor drive shaft is disposed longitudinally and a main gear is formed around a periphery of the drive shaft, a master gear shaft is disposed laterally, and a first mater gear is fixed on one end of the master gear shaft, and inner teeth around a periphery of the first master gear engage teeth of the main gear, the double-gear driving mechanism being characterized in that, an idle pinion provided on the other end of the master gear shaft is fixed a second master gear, inner teeth of which engage the teeth of the idle pinion.

2. The double-gear driving mechanism for a reel unit according to claim 1, being characterized in that a front wall of the reel chamber is formed with a through-hole and a first hole, and a rear wall of the reel chamber is formed with a second hole corresponding to the first hole, a reciprocating shaft inserts therethrough an axial through-hole of the drive shaft, the reciprocating shaft is capable of reciprocating through the axial through-hole, the idle pinion is also formed with an axial through-hole for a front protrusion of a cam shaft having bidirectional spiral grooves to be inserted therethrough and fixed therein, a slide block having a first and a second through-hole slides over the cam shaft by means of the first through-hole, the second through-hole is adapted to fix a rear protrusion of the reciprocating shaft, and the first and the second holes are provided to mount the cam shaft while the through-hole is provided to mount the drive shaft.

3. The double-gear driving mechanism for a reel unit according to claim 2, being characterized in that the through-hole, the first hole and the second hole are provided with a bearing respectively.

4. The double-gear driving mechanism for a reel unit according in claim 1, being characterized in that at least one of the master gears is fixed to the master gear shaft by means of a detachable fixing mechanism.

5. The double-gear driving mechanism for a reel unit according to claim 4, being characterized in that the detachable fixing mechanism of the master gear and the master gear shaft comprises a pin hole formed in the master gear shaft as well as a pin, a butterfly retaining block, an elastic ring and a protrusion formed with a butterfly-shaped cavity inside the gear that are sequentially nested together.

6. The-double-gear driving mechanism for a reel unit according to claim 4, being characterized in that the at least one master gear and the master gear shaft are connected with each other by means of a spline.

* * * * *